(12) United States Patent
Nakayama et al.

(10) Patent No.: US 11,664,503 B2
(45) Date of Patent: May 30, 2023

(54) SECONDARY BATTERY POSITIVE ELECTRODE, AND SECONDARY BATTERY

(71) Applicant: PANASONIC INTELLECTUAL PROPERTY MANAGEMENT CO., LTD., Osaka (JP)

(72) Inventors: Takahito Nakayama, Osaka (JP); Tomoki Shiozaki, Osaka (JP); Hideharu Takezawa, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 195 days.

(21) Appl. No.: 16/695,920

(22) Filed: Nov. 26, 2019

(65) Prior Publication Data

US 2020/0099057 A1  Mar. 26, 2020

Related U.S. Application Data

(63) Continuation of application No. PCT/JP2018/014192, filed on Apr. 3, 2018.

(30) Foreign Application Priority Data

May 30, 2017  (JP) .............................. JP2017-107181

(51) Int. Cl.
*H01M 4/66* (2006.01)
*H01M 4/36* (2006.01)
(Continued)

(52) U.S. Cl.
CPC ........... *H01M 4/668* (2013.01); *H01M 4/364* (2013.01); *H01M 4/58* (2013.01); *H01M 2004/027* (2013.01); *H01M 2004/028* (2013.01)

(58) Field of Classification Search
CPC ........ H01M 4/668; H01M 4/364; H01M 4/58; H01M 2004/027; H01M 2004/28;
(Continued)

(56) References Cited

U.S. PATENT DOCUMENTS

2006/0222953 A1  10/2006  Inoue et al.
2010/0086857 A1*  4/2010  Higuchi .................. H01M 4/58
                                              429/231.95
(Continued)

FOREIGN PATENT DOCUMENTS

CN    101346835 A    1/2009
CN    105470451 A    4/2016
(Continued)

OTHER PUBLICATIONS

International Search Report dated May 15, 2018, issued in counterpart application No. PCT/JP2018/014192, with English translation. (4 pages).

(Continued)

Primary Examiner — Kiran Quraishi Akhtar
(74) Attorney, Agent, or Firm — WHDA, LLP

(57) ABSTRACT

This secondary battery positive electrode is provided with a positive-electrode current collector, a positive-electrode mixture layer, and an intermediate layer disposed between the positive-electrode current collector and the positive-electrode mixture layer. The intermediate layer comprises: a first intermediate layer that includes a non-oxide conductive inorganic compound and a positive-electrode active material; and a second intermediate layer that includes an insulating inorganic material and a non-oxide conductive inorganic compound. The conductive inorganic compound becomes an insulating oxide at 300° C. or above.

10 Claims, 3 Drawing Sheets

(51) Int. Cl.
*H01M 4/58* (2010.01)
*H01M 4/02* (2006.01)

(58) Field of Classification Search
CPC ........ H01M 4/64; H01M 4/667; H01M 4/666;
H01M 4/665; H01M 4/663; H01M 4/662;
H01M 4/661; H01M 4/66; H01M 4/61;
H01M 4/664; H01M 4/36; H01M 4/366;
H01M 2004/028; H01M 4/131; H01M
4/62; H01M 4/625; H01M 10/0525;
Y02E 60/10
See application file for complete search history.

(56) References Cited

U.S. PATENT DOCUMENTS

| | | | | |
|---|---|---|---|---|
| 2011/0123866 A1* | 5/2011 | Pan | ............... | H01M 4/583 |
| | | | | 429/221 |
| 2011/0200884 A1* | 8/2011 | Uchida | ............ | H01M 4/139 |
| | | | | 429/245 |
| 2013/0089781 A1* | 4/2013 | Miyazaki | ............ | H01G 11/28 |
| | | | | 429/211 |
| 2013/0122359 A1* | 5/2013 | Sato | ............ | H01M 4/13 |
| | | | | 429/188 |
| 2013/0130107 A1 | 5/2013 | Uchida | | |
| 2016/0013480 A1* | 1/2016 | Sikha | ............ | H01M 4/661 |
| | | | | 427/126.6 |
| 2016/0093922 A1 | 3/2016 | Endo et al. | | |
| 2016/0285073 A1 | 9/2016 | Fujita et al. | | |

FOREIGN PATENT DOCUMENTS

| | | |
|---|---|---|
| JP | H06-231749 A | 8/1994 |
| JP | 2012-49023 A | 3/2012 |
| JP | 2012-59418 A | 3/2012 |
| JP | 2014-203625 A | 10/2014 |
| JP | 2016-186933 A | 10/2016 |
| WO | 2005/020355 A1 | 3/2005 |
| WO | 2007/077870 A1 | 7/2007 |
| WO | 2011/083585 A1 | 7/2011 |
| WO | 2012/017546 A1 | 2/2012 |

OTHER PUBLICATIONS

English Translation of Search Report dated Jan. 5, 2022, issued in counterpart CN Application No. 201880030243.6. (3 pages).

* cited by examiner

SECONDARY BATTERY POSITIVE ELECTRODE, AND SECONDARY BATTERY

TECHNICAL FIELD

The present invention relates to techniques of a positive electrode for a secondary battery, and a secondary battery.

BACKGROUND ART

Recently, a non-aqueous electrolyte secondary battery has been widely used that comprises a positive electrode, a negative electrode, and a non-aqueous electrolyte and achieves charge and discharge by movement of lithium ions between positive and negative electrodes, the secondary battery providing high output and a high energy density.

For example, Patent Literature 1 discloses that a positive electrode current collector having a current collector main body and a coating layer formed on the surface of the current collector main body and including binder particles and conductive particles is used as a positive electrode current collector for forming a positive electrode to obtain good charge/discharge cyclic characteristics, and that at least part of the conductive particles are distributed electrically continuously from one side of the coating layer on the current collector main body side to the opposing other side of the coating layer.

For example, Patent Literature 2 discloses that a positive electrode active material including a lithium complex oxide and a high thermally conductive compound having a thermal conductivity of 10 W/m·K or more is used as a positive electrode active material for forming a positive electrode to obtain good charge/discharge cyclic characteristics.

For a non-aqueous electrolyte secondary battery, it is an important issue to prevent the temperature rise of the battery when internal shorts occurs, in view of high safety of the battery.

For example, Patent Literature 3 discloses that a storage battery element including an electrode current collector, a layer formed on the surface of the electrode current collector and including as a main ingredient a thermally sensitive resistor having a positive temperature coefficient of resistance, and an electrode layer formed thereon and storing electric energy. Patent Literature 3 discloses that when the battery generate heat due to internal short, the resistance value of the layer including as a main ingredient a thermally sensitive resistor having a positive temperature coefficient of resistance suddenly increases to enable restraint of short circuit current.

CITATION LIST

Patent Literature

PATENT LITERATURE 1: Japanese Unexamined Patent Application Publication No. 2014-203625
PATENT LITERATURE 2: Japanese Unexamined Patent Application Publication No. 2016-186933
PATENT LITERATURE 3: Japanese Unexamined Patent Application Publication No. H06-231749

SUMMARY

However, $BaTiO_3$ listed as the thermally sensitive resistor in Patent Literature 3 has a higher resistivity at a room temperature than carbon, which is generally used as a positive electrode conductive agent. There is a risk that when $BaTiO_3$ is used as a material for a positive electrode or a negative electrode, the battery performance may be largely reduced. Even if short circuit current is restrained by increase in the resistance of the layer including a thermally sensitive resistor as a main ingredient, the resistance of the layer including a thermally sensitive resistor as a main ingredient decreases again when the battery temperature falls down. Therefore, heat generation in the battery due to internal short may continue, and thus the temperature rise of the battery after internal short may not be prevented.

Therefore, an advantage of the present disclosure is to provide a positive electrode for a secondary battery that can prevent the temperature rise thereof after internal short, and a secondary battery comprising the positive electrode.

A positive electrode for a secondary battery according to the first aspect of the present disclosure comprises: a positive electrode current collector, a positive electrode mixture layer, and an intermediate layer disposed between the positive electrode current collector and the positive electrode mixture layer, wherein
the intermediate layer includes: a first intermediate layer including an electrically conductive inorganic compound that is a nonoxide and a positive electrode active material, and a second intermediate layer including an insulating inorganic material and an electrically conductive inorganic compound that is a nonoxide, and
the electrically conductive inorganic compound reacts to become an insulating oxide at 300° C. or more.

A positive electrode for a secondary battery according to the second aspect of the present disclosure comprises: a positive electrode current collector, a positive electrode mixture layer, and an intermediate layer disposed between the positive electrode current collector and the positive electrode mixture layer, wherein
the intermediate layer includes an electrically conductive inorganic compound that is a nonoxide and a positive electrode active material and
the electrically conductive inorganic compound reacts to become an insulating oxide at 300° C. or more.

A positive electrode for a secondary battery according to the third aspect of the present disclosure comprises: a positive electrode current collector, a positive electrode mixture layer, and an intermediate layer disposed between the positive electrode current collector and the positive electrode mixture layer, wherein
the intermediate layer includes an electrically conductive inorganic compound that is a nonoxide and an insulating inorganic material, and
the electrically conductive inorganic compound reacts to become an insulating oxide at 300° C. or more.

A secondary battery according to the present disclosure includes a positive electrode, a negative electrode, and an electrolyte, the positive electrode being any of the positive electrodes for a secondary battery described above.

According to the present disclosure, the temperature rise of the battery after internal short can be prevented.

DESCRIPTION OF EMBODIMENTS

Figure 1:
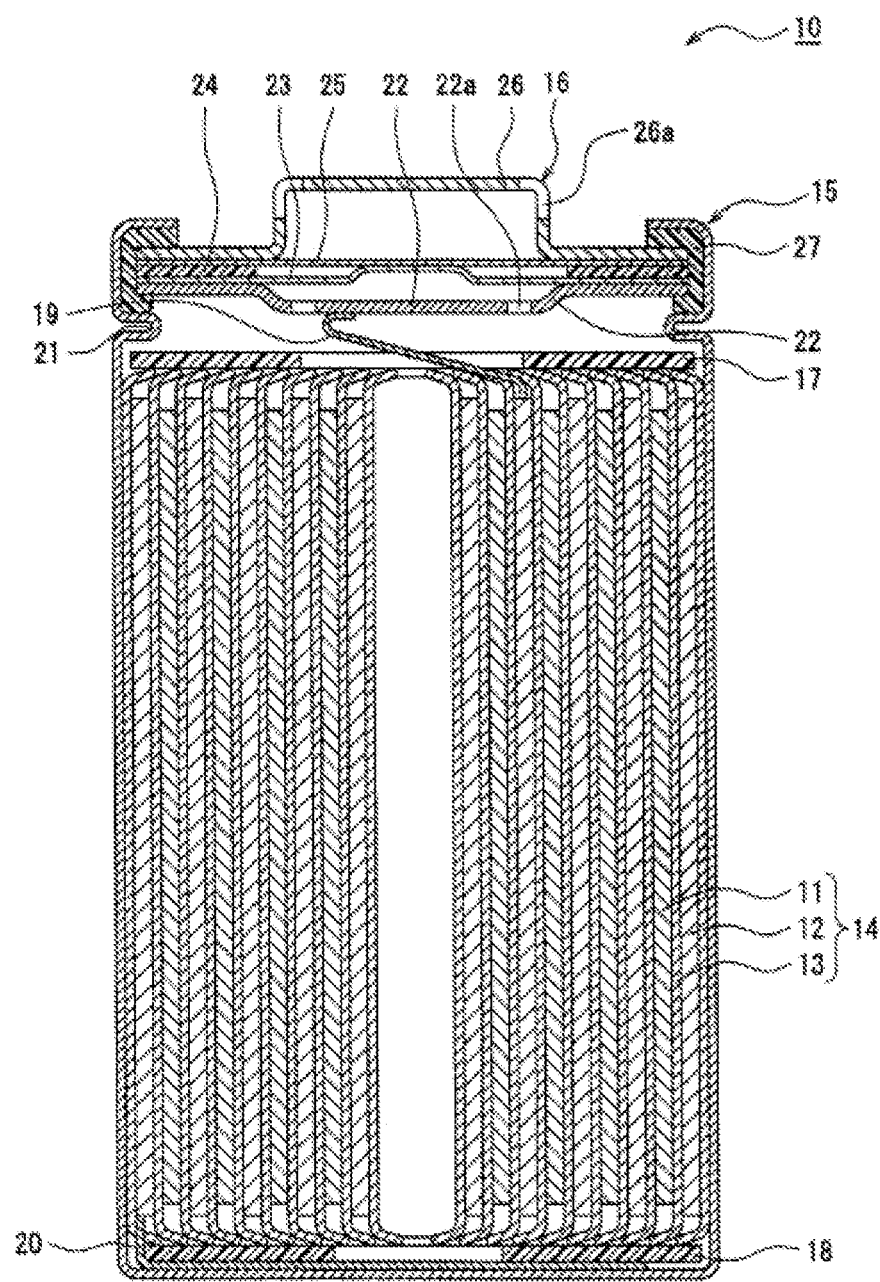
FIG. 1 is a sectional view of a secondary battery as an exemplary embodiment.

The positive electrode for a secondary battery according to the first aspect of the present disclosure comprises: a positive electrode current collector, a positive electrode mixture layer, and an intermediate layer disposed between the positive electrode current collector and the positive electrode mixture layer. The intermediate layer includes: a first intermediate layer including an electrically conductive inorganic compound that is a nonoxide and a positive electrode active material, and a second intermediate layer including an insulating inorganic material and an electrically conductive inorganic compound that is a nonoxide. The electrically conductive inorganic compound reacts to become an insulating oxide at 300° C. or more. For example, if an electrically conductive foreign matter with negative electric potential, or the like, reaches to the positive electrode current collector to cause internal short, the temperature around the positive electrode current collector coming into contact with the electrically conductive foreign matter increases to at least 300° C. or more. Therefore, if internal short occurs, the electrically conductive inorganic compound included in the intermediate layer in the first aspect of the present disclosure is heated (oxidized) to turn into an insulating oxide. As a result, the intermediate layer including the insulating oxide and the insulating inorganic material are present as a large resistant component around the electrically conductive foreign matter, thereby restraining short circuit current between the positive and negative electrodes. As a result of restraint of short circuit current, the intermediate layer including the insulating oxide and the insulating inorganic material maintains a high resistance even when the battery temperature falls down, and a continuation of the heat generation in the battery due to internal short can thus be prevented. Because of these, the temperature rise of the battery after internal short can be sufficiently prevented. In a normal state where internal short does not occur, the electrical conduction between the positive electrode mixture layer and the positive electrode current collector is secured by the electrically conductive inorganic compounds in the first intermediate layer and the second intermediate layer.

The positive electrode for a secondary battery according to the second aspect of the present disclosure comprises: a positive electrode current collector, a positive electrode mixture layer, and an intermediate layer disposed between the positive electrode current collector and the positive electrode mixture layer. The intermediate layer includes an electrically conductive inorganic compound that is a nonoxide and a positive electrode active material, and the electrically conductive inorganic compound reacts to become an insulating oxide at 300° C. or more. If internal short occurs, the electrically conductive inorganic compound included in the intermediate layer reacts to become an insulating oxide also in the second aspect of the present disclosure, as in the above. As a result, the intermediate layer including the insulating oxide is present as a large resistant component around the electrically conductive foreign matter, thereby restraining short circuit current between the positive and negative electrodes. As a result of restraint of short circuit current, the intermediate layer including the insulating oxide maintains a high resistance even when the battery temperature falls down, and a continuation of the heat generation in the battery due to internal short can thus be prevented. Because of these, the temperature rise of the battery after internal short can be sufficiently prevented. In a normal state where internal short does not occur, the electrical conduction between the positive electrode mixture layer and the positive electrode current collector is secured by the electrically conductive inorganic compound in the intermediate layer.

The positive electrode for a secondary battery according to the third aspect of the present invention comprises a positive electrode current collector, a positive electrode mixture layer, and an intermediate layer disposed between the positive electrode current collector and the positive electrode mixture layer. The intermediate layer includes an electrically conductive inorganic compound that is a nonoxide and an insulating inorganic material, and the electrically conductive inorganic compound reacts to become an insulating oxide at 300° C. or more. If internal short occurs, the electrically conductive inorganic compound included in the intermediate layer reacts to become an insulating oxide also in the third embodiment of the present disclosure, as in the above. As a result, the intermediate layer including the insulating oxide and the insulating inorganic material is present as a large resistant component around the electrically conductive foreign matter, thereby restraining short circuit current between the positive and negative electrodes. As a result of restraint of short circuit current, the intermediate layer including the insulating oxide and the insulating inorganic material maintains a high resistance even when the battery temperature falls down, and a continuation of the heat generation in the battery due to internal short can thus be prevented. Because of these, the temperature rise of the battery after internal short can be sufficiently prevented. In a normal state where internal short does not occur, the electrical conduction between the positive electrode mixture layer and the positive electrode current collector is secured by the electrically conductive inorganic compound in the intermediate layer.

Hereinafter, exemplary embodiments will be described in detail. The drawings referred for the description of embodiments are schematically illustrated, and the dimensions, the proportion, and the like of the components illustrated in the drawings may be different from those of actual products.

FIG. 1 is a sectional view of a secondary battery as an exemplary embodiment. The secondary battery 10 shown in FIG. 1 comprises: an electrode assembly 14 having a wound structure in which a positive electrode 11 and a negative electrode 12 are wound together with a separator 13 therebetween; an electrolyte; insulating plates 17 and 18 respectively disposed on the upper and lower sides of the electrode assembly 14; and a battery case that houses these members. The battery case is constituted of a cylindrical case body 15 having a closed-end and a sealing assembly 16. Instead of the electrode assembly 14 having a wound structure, an electrode assembly of another type may be used, including an electrode assembly having a laminated structure formed by alternately laminating positive electrodes and negative electrodes with separators therebetween. The battery case may be a metal case having a cylindrical shape, a rectangular shape, a coin shape, a button shape, or another shape, or a resin case constituted of laminated resin films (for laminate batteries), for example.

The case body 15 is, for example, a cylindrical metal container having a closed-end. A gasket 27 is disposed between the case body 15 and the sealing assembly 16 to ensure that the battery case is tightly sealed. The case body 15 preferably includes a projecting portion 21 formed by, for example, pressing the lateral surface from outside to support the sealing assembly 16. The projecting portion 21 is preferably formed annularly along the circumferential direction of the case body 15, and the upper surface thereof supports the sealing assembly 16.

The sealing assembly 16 includes the filter 22 having an opening 22a and a vent member disposed on the filter 22. The vent member blocks the opening 22a of the filter 22, and ruptures if the internal pressure of the battery increases due to heat generation by internal short, for example. In the present embodiment, a lower vent member 23 and an upper vent member 25 are provided as vent members. An insulating member 24 disposed between the lower vent member 23 and the upper vent member 25, and a cap 26 having a cap opening 26a are further is provided. Each of the members constituting the sealing assembly 16 has, for example, a disk or ring shape, and the members other than the insulating member 24 are electrically connected to each other. Specifically, the filter 22 and the lower vent member 23 are bonded to each other at their circumferences, and the upper vent member 25 and the cap 26 are also bonded to each other at their circumferences. The lower vent member 23 and the upper vent member 25 are bonded to each other at their middle portions and the insulating member 24 is interposed between their circumferences. If the internal pressure increases by heat generation due to, for example, internal short, the lower vent member 23 ruptures at, for example, the thin portion thereof. The upper vent member 25 thus bulges toward the cap 26 and comes off the lower vent member 23, thereby breaking the electrical connection therebetween.

In the secondary battery 10 shown in FIG. 1, a positive electrode lead 19 attached to the positive electrode 11 passes through a through-hole in the insulating plate 17 and extends toward the sealing assembly 16, and a negative electrode lead 20 attached to the negative electrode 12 extends on the outside of the insulating plate 18 to the bottom side of the case body 15. The positive electrode lead 19 is connected to the lower surface of the filter 22, which is the bottom board of the sealing assembly 16, by welding or the like, and the cap 26, which is the top board of the sealing assembly 16, electrically connected to the filter 22, serves as a positive terminal. The negative electrode lead 20 is connected to the inner surface of the bottom of the case body 15 by welding or the like, and the case body 15 serves as a negative terminal.

[Positive Electrode]

Figure 2:
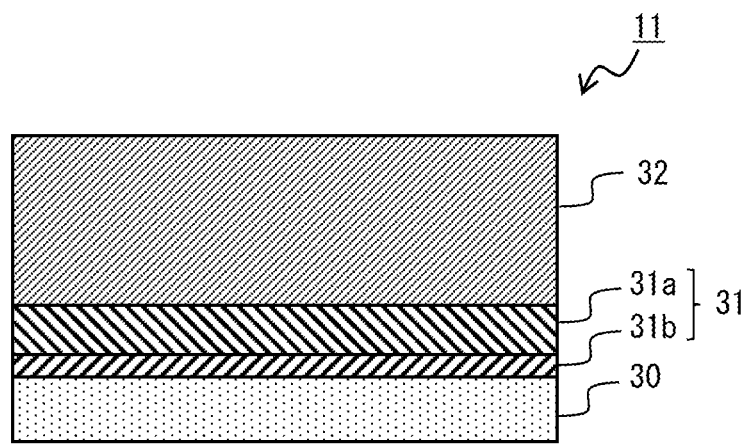
FIG. 2 is a sectional view of a positive electrode according to the first embodiment.

FIG. 2 is a sectional view of a positive electrode according to the first embodiment. The positive electrode 11 comprises a positive electrode current collector 30, a positive electrode mixture layer 32, and an intermediate layer 31 disposed between the positive electrode current collector 30 and the positive electrode mixture layer 32. The intermediate layer 31 includes a first intermediate layer 31a and a second intermediate layer 31b. The second intermediate layer 31b is disposed on the positive electrode current collector 30, and the first intermediate layer 31a is disposed on the second intermediate layer 31b.

Foil of a metal, such as aluminum or an aluminum alloy, which is stable in the electric potential range of the positive electrode, a film with such a metal disposed as an outer layer, and the like can be used for the positive electrode current collector 30. The positive electrode current collector 30 has a thickness, for example, of about 10 μm to 100 μm.

The positive electrode mixture layer 32 includes a positive electrode active material. The positive electrode mixture layer 32 preferably includes a binder, in view of bonding particles of the positive electrode active material to each other to ensure the mechanical strength of the positive electrode mixture layer 32, and also in view of increasing the bondability between the positive electrode mixture layer 32 and the intermediate layer 31. The positive electrode mixture layer 32 preferably includes a conductive agent, in view of enhancing the electrical conductivity of the layer.

Examples of the positive electrode active material include a lithium/transition metal oxide containing a transition metal element such as Co, Mn, or Ni. Examples of the lithium/transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, $Li_2MPO_4F$ (M; at least one of Na, Mg, Sc, Y, Mn, Fe, Co, Ni, Cu, Zn, Al, Cr, Pb, Sb, and B, $0<x\le1.2$, $0<y\le0.9$, $2.0\le z\le2.3$). These may be used singly or two or more thereof may be mixed and used. The positive electrode active material preferably include a lithium/nickel complex oxide such as $Li_xNiO_2$, $Li_xCo_yNi_{1-y}O_2$, $Li_xNi_{1-y}M_yO_z$ (M; at least one of Na, Mg, Sc, Y, Mn, Fe, Co, Ni, Cu, Zn, Al, Cr, Pb, Sb, and B, $0<x\le1.2$, $0<y\le0.9$, $2.0\le z\le2.3$).

Examples of the conductive agent include carbon particles such as carbon black (CB), acetylene black (AB), Ketjenblack, and graphite. These may be used singly or in combinations of two or more thereof.

Examples of the binder include fluoro resins, such as polytetrafluoroethylene (PTFE) and poly(vinylidene fluoride) (PVdF), polyacrylonitrile (PAN), polyimides, acrylic resins, and polyolefins. These resins may be combined with carboxymethyl cellulose (CMC) or a salt thereof (e.g., CMC-Na, CMC-K, and CMC-$NH_4$; partially neutralized salt may also be used), poly(ethylene oxide) (PEO), or the like. These may be used singly or in combinations of two or more thereof.

The first intermediate layer 31a composing the intermediate layer includes an electrically conductive inorganic compound that is a nonoxide and a positive electrode active material. The second intermediate layer 31b composing the intermediate layer 31 includes an electrically conductive inorganic compound that is a nonoxide and an insulating inorganic material. The first intermediate layer 31a and the second intermediate layer 31b preferably include a binder in view of increase in the mechanical strength of the layers and the adhesion to other layers. The electrically conductive inorganic compound that is a nonoxide is hereinafter sometimes referred simply to as an electrically conductive inorganic compound.

The electrically conductive inorganic compound included in the first intermediate layer 31a or the second intermediate layer 31b is not particularly limited as long as it is a material that reacts to become an insulating oxide at 300° C. or more, and it is preferably a material that reacts to become an insulating oxide at temperature of 300° C. or more and 500° C. or less. Examples of the electrically conductive inorganic compound include a metal carbide, a metal nitride, a metal boride, and metal silicide that include an metal element such as Ti (titanium), Zr (zirconium), Hf (hafnium), V (vanadium), Nb (niobium), Ta (tantalum), W (tungsten), Mo (molybdenum), Fe (iron), Ni (nickel), or Cr (chromium). Specific examples of the electrically conductive inorganic compound that reacts to become an insulating oxide at 300° C. or more include TiC, ZrC, HfC, VC, NbC, TaC, WC, TiN, ZrN, HfN, VN, NbN, TaN, $TiB_2$, $ZrB_2$, $HfB_2$, $VB_2$, $NbB_2$, $TaB_2$, $W_2B_5$, $Mo_2B_5$, FeB, NiB, $TiSi_2$, $ZrSi_2$, $CrSi_2$, $VSi_2$, $NbSi_2$, $TaSi_2$, $WSi_2$, and $MoSi_2$. Examples of the material that reacts to become an insulating oxide at a temperature of 300° C. or more and 500° C. or less, among those listed above, include TiC, VC, NbC, TiN, and $MoSi_2$. These may be used singly or in combinations of two or more thereof.

The electrically conductive inorganic compound is preferably a material that has a resistivity of $10^{-2}$ Ωcm or less before turning into an insulating oxide and a resistivity of $10^{12}$ Ωcm or more after turning into an insulating oxide, in view of further improving electrical conductivity of the intermediate layer 31 in a normal state where internal short does not occur and also improving the insulation property of the intermediate layer 31 after internal short. These may be used singly or in combinations of two or more thereof.

The electrically conductive inorganic compound included in the first intermediate layer 31a and that included in the second intermediate layer 31b may be materials that are the same or different to each other. When they are the same material, the oxidation temperatures thereof are also the same, which brings about an advantage that the stable insulation properties are maintained in a high temperature range. On the other hand, when they are materials different from each other, different roles can be given to the layers, which brings about an advantage that both of the battery properties and the safety can be provided; specifically, for example, the layer 31a includes a material having a low resistivity to emphasize the battery properties whereas the layer 31b includes a material having a low oxidation temperature to emphasize the safety.

Examples of the positive electrode active material included in the first intermediate layer 31a include lithium/transition metal oxide containing a transition metal element such as Co, Mn, or Ni. Specific examples of the lithium/transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}MyO_4$, $LiMPO_4$, $Li_2MPO_4F$ (M; at least one of Na, Mg, Sc, Y, Mn, Fe, Co, Ni, Cu, Zn, Al, Cr, Pb, Sb, and B; $0<x\leq1.2$, $0<y\leq0.9$, $2.0\leq z\leq2.3$). These may be used singly or two or more thereof may be mixed and used.

The positive electrode active material included in the first intermediate layer 31a and that included in the positive electrode mixture layer 32 may be materials that are the same or materials that are different to each other. When they are the same material, the deterioration (change in quality) of the active material in long time use of the battery tends to be uniform in the mixture, which brings about an advantage that the properties are stable for a long time. On the other hand, when they are materials different from each other, different roles can be given to the layers, which brings about an advantage that both of the battery properties and the safety can be provided; specifically, for example, the positive electrode mixture layer 32 includes an active material to emphasize the capacity whereas the intermediate layer 31a includes an active material to emphasize the safety (having a high resistivity).

The insulating inorganic material included in the second intermediate layer 31b is an inorganic material having the insulation property even in a normal state where internal short does not occur, and for example, is preferably an inorganic material having a resistivity of $10^{12}$ Ωcm or more. Specific examples of the insulating inorganic material include metal oxide particles, metal nitride particles, metal fluoride particles, and insulating magnetic particles. Examples of the metal oxide particles include aluminum oxide, titanium oxide, zirconium oxide, silicon oxide, manganese oxide, magnesium oxide, and nickel oxide. Examples of the metal nitride particles include boron nitride, aluminum nitride, magnesium nitride, and silicon nitride. Examples of the metal fluoride particles include aluminum fluoride, lithium fluoride, sodium fluoride, magnesium fluoride, calcium fluoride, barium fluoride, aluminum hydroxide, and boehmite. Examples of the insulating magnetic particles include Ni—Cu—Zn ferrite. The insulating inorganic material preferably includes at least one of aluminum oxide, titanium oxide, silicon oxide, and manganese oxide, and more preferably includes at least aluminum oxide, in view of insulation, high melting point, and other properties.

The thickness of the first intermediate layer 31a is preferably one half or less of the thickness of the positive electrode mixture layer 32. If the thickness of the first intermediate layer 31a is more than one half of the thickness of the positive electrode mixture layer 32, the flexibility of the ingredients of the positive electrode as a whole is lower than that of the case where the thickness of the first intermediate layer 31a is one half or less of the thickness of the positive electrode mixture layer 32, which may easily cause a folding, breaking, or the like. For the lower limit, the thickness of the first intermediate layer 31a is preferably 1/150 or more of the thickness of the positive electrode mixture layer 32. If the thickness of the first intermediate layer 31a is less than 1/150 of the thickness of the positive electrode mixture layer 32, the positive electrode mixture layer 32 may be brought into direct contact with the positive electrode current collector 30 when internal short occurs, which may lead to the temperature rise of the battery.

The second intermediate layer 31b preferably has a thickness of within a range of 1 μm to 5 μm. If the second intermediate layer 31b has a thickness more than 5 μm, the resistivity of the intermediate layer 31 is larger than that in the case where the second intermediate layer 31b has a thickness within the range described above, which may impair the battery properties in a normal state where internal short does not occur. If the second intermediate layer 31b has a thickness less than 1 μm, the positive electrode mixture layer 32 is likely to bring into direct contact with the positive electrode current collector 30 when internal short occurs, compared to the case where the second intermediate layer 31b has a thickness within the range described above, which may lead to the temperature rise of the battery.

The content of the insulating inorganic material in the second intermediate layer 31b is preferably within a range of 80 mass % to 98 mass %, and the content of the electrically conductive inorganic compound in the second intermediate layer 31b is preferably 20 mass % or less. The content of the insulating inorganic material and that of the electrically conductive inorganic compound in the second intermediate layer 31b are within the respective ranges described above, the battery temperature after internal short can be more decreased, compared to the case where the contents are out of the respective ranges. For the lower limit, the content of the electrically conductive inorganic compound in the second intermediate layer 31b is preferably 0.1 mass % or more.

The content of the electrically conductive inorganic compound in the first intermediate layer 31a is preferably within a range of 0.1 mass % to 20 mass %, and the content of the positive electrode active material in the first intermediate layer 31a is preferably within a range of 80 mass % to 99.9 mass %. The content of the electrically conductive inorganic compound and that of the positive electrode active material in the first intermediate layer 31a are within the respective ranges described above, the battery temperature after internal short can be more decreased, compared to the case where the contents are out of the respective ranges.

Examples of the binder included in the first intermediate layer 31a or the second intermediate layer 31b include fluoro resins, such as polytetrafluoroethylene (PTFE) and poly (vinylidene fluoride) (PVdF), polyacrylonitrile (PAN), polyimides, acrylic resins, and polyolefins. These may be used singly or in combinations of two or more thereof. The content of the binder in the first intermediate layer 31a and that in the second intermediate layer 31b are each preferably 0.1 mass % to 5 mass %, and more preferably 1 mass % to 3 mass %.

The first intermediate layer 31a and the second intermediate layer 31b each preferably include no carbon particles (carbon conductive agent), such as carbon black (CB), acetylene black (AB), Ketjenblack, and graphite. The boundary between the positive electrode mixture layer 32 and the first intermediate layer 31a may not be defined clearly, and taking this into consideration, it is preferable that no carbon particles (carbon conductive agent) be present in the area where the insulating inorganic material of the second intermediate layer 31b is present. When a carbon conductive agent is incorporated into the first intermediate layer 31a or the second intermediate layer 31b, the content of the carbon conductive agent is preferably 0.5 mass % or less based on the total mass of the intermediate layer 31. If the first intermediate layer 31a or the second intermediate layer 31b includes the carbon conductive agent in a certain amount or more, heat generation in the battery due to internal short may continue to thereby fail to sufficiently prevent the temperature rise of the battery after internal short.

For the first embodiment, the intermediate layer 31 has been described that includes the second intermediate layer 31b disposed on the positive electrode current collector 30, and the first intermediate layer 31a disposed on the second intermediate layer 31b. Alternatively, the intermediate layer may include the first intermediate layer 31a disposed on the positive electrode current collector 30, and the second intermediate layer 31b disposed on the first intermediate layer 31a, or the intermediate layer may include the first intermediate layer 31a and the second intermediate layer 31b both disposed on the positive electrode current collector 30. Among these configurations, preferred is the intermediate layer 31 that includes the second intermediate layer 31b disposed on the positive electrode current collector 30 and the first intermediate layer 31a disposed on the second intermediate layer 31b, in view of highly preventing the temperature rise of the battery after internal short.

An exemplary method for producing the positive electrode 11 is described. First, a slurry for the second intermediate layer including the insulating inorganic material, the electrically conductive inorganic compound, and other ingredients is applied to the positive electrode current collector 30, and dried, to thereby form the second intermediate layer 31b thereon. Next, a slurry for the first intermediate layer including the positive electrode active material, the electrically conductive inorganic compound, and other ingredients is applied to the second intermediate layer 31b, and dried, to thereby form the first intermediate layer 31a thereon. Furthermore, a positive electrode mixture slurry including the positive electrode active material and other ingredients is applied to the first intermediate layer 31a, and dried, to thereby form the positive electrode mixture layer 32 thereon, and then the positive electrode mixture layer 32 is rolled. In this manner, the positive electrode 11 can be obtained.

Figure 3:
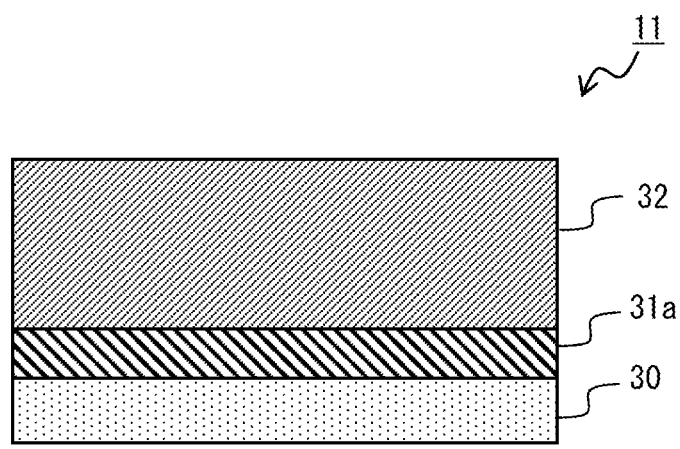
FIG. 3 is a sectional view of a positive electrode according to the second embodiment.

FIG. 3 is a sectional view of a positive electrode according to the second embodiment. In the positive electrode 11 in FIG. 3, the same components as of the positive electrode 11 shown in FIG. 2 are designated by the same numerical signs, and the descriptions therefor will be omitted. The positive electrode 11 shown in FIG. 3 comprises a positive electrode current collector 30, a positive electrode mixture layer 32, and a first intermediate layer 31a disposed between the positive electrode current collector 30 and the positive electrode mixture layer 32. Therefore, the first intermediate layer 31a includes the electrically conductive inorganic compound and the positive electrode active material described above. For the first intermediate layer 31a shown in FIG. 3, the thickness thereof, the contents of the electrically conductive inorganic compound and the positive electrode active material, and the other conditions are the same as described above. The first intermediate layer 31a shown in FIG. 3 may include the insulating inorganic material, the binder, and other ingredients described above.

Figure 4:
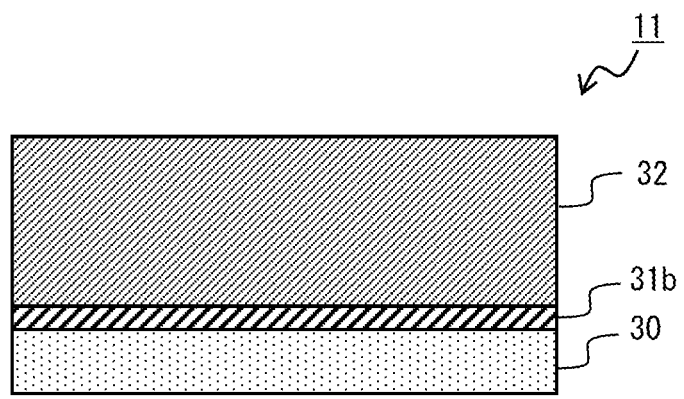
FIG. 4 is a sectional view of a positive electrode according to the third embodiment.

FIG. 4 is a sectional view of a positive electrode according to the third embodiment. In the positive electrode 11 in FIG. 4, the same components as of the positive electrode 11 shown in FIG. 2 are designated by the same numerical signs, and the descriptions therefor will be omitted. The positive electrode 11 shown in FIG. 4 comprises a positive electrode current collector 30, a positive electrode mixture layer 32, and a second intermediate layer 31b disposed between the positive electrode current collector 30 and the positive electrode mixture layer 32. Therefore, the second intermediate layer 31b includes the electrically conductive inorganic compound and the insulating inorganic material described above. For the second intermediate layer 31b shown in FIG. 4, the thickness thereof, the contents of the electrically conductive inorganic compound and the insulating inorganic material, and the other conditions are the same as described above. The second intermediate layer 31b shown in FIG. 4 may include the positive electrode active material, the binder, and other ingredients described above.

[Negative Electrode]

The negative electrode 12 comprises, for example, a negative electrode current collector formed of a metal foil, for example, and a negative electrode mixture layer formed on the negative electrode current collector. Foil of a metal, such as copper, that is stable in the electric potential range of the negative electrode, a film with such a metal disposed on an outer layer, and the like can be used for the negative electrode current collector. The negative electrode mixture layer includes, for example, a negative electrode active material, a binder, and a thickener, and other ingredients.

The negative electrode 12 can be obtained by, for example, applying a negative electrode mixture slurry including the negative electrode active material, the thickener, and the binder to the negative electrode current collector, drying the resultant coating to form a negative electrode mixture layer on the negative electrode current collector, and rolling the negative electrode mixture layer. The negative electrode mixture layer may be formed on each of the both sides of the negative electrode current collector.

The negative electrode active material is not particularly limited as long as it is a material that can intercalate and deintercalate lithium ions, and examples thereof include lithium metal, lithium alloys such as lithium-aluminum alloy, lithium-lead alloy, lithium-silicon alloy, and lithium-tin alloy, carbon materials such as graphite, coke, and organic fired materials, and metal oxides such as $SnO_2$, SnO, and $TiO_2$. These may be used singly or in combinations of two or more thereof.

As the binder included in the negative electrode mixture layer, a fluoro resin, PAN, a polyimide resin, an acrylic resin, a polyolefin resin, or the like can be used, as in the positive electrode. When a negative electrode mixture slurry is prepared using an aqueous medium, styrene-butadiene rubber (SBR), CMC or a salt thereof, poly(acrylic acid) (PAA)

or a salt thereof (PAA-Na, PAA-K, or the like which may be a partially neutralized salt), or poly(vinyl alcohol) (PVA) is preferably used.

[Separator]

For example, an ion-permeable and insulating porous sheet is used as the separator 13. Specific examples of the porous sheet include a microporous thin film, woven fabric, and nonwoven fabric. Suitable examples of the material for the separator include olefin resins such as polyethylene and polypropylene, and cellulose. The separator 13 may be a laminate including a cellulose fiber layer and a layer of fibers of a thermoplastic resin such as an olefin resin. The separator 13 may be a multi-layered separator including a polyethylene layer and a polypropylene layer, and a surface of a separator to be used may be coated with a material such as an aramid resin or ceramic.

[Electrolyte]

The electrolyte includes a solvent and an electrolyte salt dissolved in the solvent. The electrolyte is not limited to a liquid electrolyte (non-aqueous electrolyte), and may be a solid electrolyte using a gel polymer or the like. As the solvent, a non-aqueous solvent or water can be used, and example of the non-aqueous solvent include esters, ethers, nitriles such as acetonitrile, amides such as dimethylformamide, and mixed solvents of two or more thereof. The non-aqueous solvent may include a halogen-substituted product formed by replacing at least one hydrogen atom of any of the above solvents with a halogen atom such as fluorine.

Examples of the esters include cyclic carbonate esters, such as ethylene carbonate (EC), propylene carbonate (PC), and butylene carbonate; chain carbonate esters, such as dimethyl carbonate (DMC), methyl ethyl carbonate (EMC), diethyl carbonate (DEC), methyl propyl carbonate, ethyl propyl carbonate, and methyl isopropyl carbonate; cyclic carboxylate esters such as γ-butyrolactone and γ-valerolactone; and chain carboxylate esters such as methyl acetate, ethyl acetate, propyl acetate, methyl propionate (MP) and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as, 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

Preferable examples of the halogen-substituted product for use include a fluorinated cyclic carbonate ester such as fluoroethylene carbonate (FEC), a fluorinated chain carbonate ester, and a fluorinated chain carboxylate ester such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (where $1 \le x \le 6$, and n is 1 or 2), $LiB_{10}Cl_{10}$, LiCl, LiBr, LiI, chloroborane lithium, lithium short-chain aliphatic carboxylates; borate salts such as $Li_2B_4O_7$, $Li(B(C_2O_4)_2)$; and imide salts such as $LiN(SO_2CF_3)_2$ and $LiN(C_lF_{2l+1}SO_2)(C_mF_{2m+1}SO_2)$ (where l and m are integers of 1 or more). These lithium salts may be used singly or two or more thereof may be mixed and used. Among these, $LiPF_6$ is preferably used in view of ionic conductivity, electrochemical stability, and other properties. The concentration of the lithium salt is preferably 0.8 to 1.8 mol per 1 L of solvent.

EXAMPLES

Hereinafter, the present disclosure will be described in more details by way of Examples, but the present disclosure is not limited thereby.

Example 1

[Production of Positive Electrode]

TiC as an electrically conductive inorganic compound, $Al_2O_3$ as an insulating inorganic material, and poly (vinylidene fluoride) (PVDF) are mixed in a mass ratio of 5:94:1, and an appropriately amount of N-methyl-2-pyrrolidone (NMP) is added thereto to prepare a slurry for the second intermediate layer. Then, the slurry is applied to both sides of an aluminum foil having a thickness of 15 μm as a positive electrode current collector, and the resultant coating is dried to form the second intermediate layer having a thickness of 5 μm.

TiC as an electrically conductive inorganic compound, $LiNi_{0.5}Co_{0.2}Mn_{0.3}O_2$ as a positive electrode active material, and poly(vinylidene fluoride) (PVDF) are mixed in a mass ratio of 5:94:1, and an appropriately amount of N-methyl-2-pyrrolidone (NMP) is added thereto to prepare a slurry for the first intermediate layer. Then, the slurry is applied to the second intermediate layers, and the resultant coatings are dried to form the first intermediate layers each having a thickness of 30 μm.

$LiNi_{0.5}Co_{0.2}Mn_{0.3}O_2$ as a positive electrode active material, acetylene black (AB), and poly (vinylidene fluoride) (PVDF) are mixed in a mass ratio of 94:5:1, and an appropriately amount of N-methyl-2-pyrrolidone (NMP) is added thereto to prepare a positive electrode mixture slurry. Then, the positive electrode mixture slurry is applied to the first intermediate layers. The resultant coatings are dried, and then rolled with a roller. In the above-described manner, a positive electrode is produced that is composed of a positive electrode current collector, the second intermediate layers formed on both sides of the positive electrode current collector, the first intermediate layers formed on the second intermediate layers, and the positive electrode mixture layers formed on the first intermediate layers.

[Production of Negative Electrode]

100 parts by mass of artificial graphite, 1 part by mass of carboxymethylcellulose (CMC), and 1 part by mass of styrene-butadiene rubber (SBR) are mixed to prepare a negative electrode mixture slurry. Then, the negative electrode mixture slurry is applied to both sides of a copper foil as a negative electrode current collector. The resultant coating is dried and then rolled with a roller, to thereby produce a negative electrode composed of the negative electrode current collector and the negative electrode mixture layers formed on both sides thereof

[Production of Electrolyte]

Ethylene carbonate (EC), methyl ethyl carbonate (EMC), and dimethyl carbonate (DMC) were mixed in a volume ratio of 3:3:4. $LiPF_6$ is dissolved in the mixed solvent at a concentration of 1.2 mol/L to thereby produce a non-aqueous electrolyte.

[Production of Secondary Battery]

The positive electrode and the negative electrode obtained above are each cut into a prescribed size, and an electrode tab is attached to each of them. The electrodes are wound with the separator disposed therebetween to thereby produce a wound-type electrode assembly. This electrode assembly is then housed in an aluminum-laminated film case, and the non-aqueous electrolyte is injected thereinto. The case is sealed to thereby obtain a non-aqueous electrolyte secondary battery of Example 1.

Example 2

A positive electrode is prepared in the same manner as in Example 1, except that WC is used as an electrically conductive inorganic compound. A non-aqueous electrolyte secondary battery is prepared using the resulting positive electrode of Example 2 in the same manner as in Example 1.

Example 3

A positive electrode is prepared in the same manner as in Example 1, except that TiN is used as an electrically conductive inorganic compound. A non-aqueous electrolyte secondary battery is prepared using the resulting positive electrode of Example 3 in the same manner as in Example 1.

Example 4

A positive electrode is prepared in the same manner as in Example 1, except that the first intermediate layer is not formed on the second intermediate layer formed on the positive electrode current collector, and that the positive electrode mixture layer is formed on the second intermediate layer. A non-aqueous electrolyte secondary battery is prepared using the resulting positive electrode of Example 4 in the same manner as in Example 1.

Example 5

A positive electrode is prepared in the same manner as in Example 1, except the following: WC is used as an electrically conductive inorganic compound; the first intermediate layer is not formed on the second intermediate layer formed on the positive electrode current collector; and the positive electrode mixture layer is formed on the second intermediate layer. A non-aqueous electrolyte secondary battery is prepared using the resulting positive electrode of Example 5 in the same manner as in Example 1.

Example 6

A positive electrode is prepared in the same manner as in Example 1, except the following: TiN is used as an electrically conductive inorganic compound; the first intermediate layer is not formed on the second intermediate layer formed on the positive electrode current collector; and the positive electrode mixture layer is formed on the second intermediate layer. A non-aqueous electrolyte secondary battery is prepared using the resulting positive electrode of Example 6 in the same manner as in Example 1.

Example 7

A positive electrode is prepared in the same manner as in Example 1, except the following: the second intermediate layer is not formed on the positive electrode current collector; the first intermediate layer is formed on the positive electrode current collector; and the positive electrode mixture layer is formed on the first intermediate layer. A non-aqueous electrolyte secondary battery is prepared using the resulting positive electrode of Example 7 in the same manner as in Example 1.

Example 8

A positive electrode is prepared in the same manner as in Example 1, except the following: WC is used as an electrically conductive inorganic compound; the second intermediate layer is not formed on the positive electrode current collector; the first intermediate layer is formed on the positive electrode current collector; and the positive electrode mixture layer is formed on the first intermediate layer. A non-aqueous electrolyte secondary battery is prepared using the resulting positive electrode of Example 8 in the same manner as in Example 1.

Example 9

A positive electrode is prepared in the same manner as in Example 1, except the following: TiN is used as an electrically conductive inorganic compound; the second intermediate layer is not formed on the positive electrode current collector; the first intermediate layer is formed on the positive electrode current collector; and the positive electrode mixture layer is formed on the first intermediate layer. A non-aqueous electrolyte secondary battery is prepared using the resulting positive electrode of Example 9 in the same manner as in Example 1.

Comparative Example

A positive electrode is prepared in the same manner as in Example 1, except that the first intermediate layer or the second intermediate layer is not formed between the positive electrode current collector and the positive electrode mixture layer, and that the positive electrode mixture layer is formed on the positive electrode current collector. A non-aqueous electrolyte secondary battery is prepared using the resulting positive electrode of Comparative Example in the same manner as in Example 1.

[Nail-Driving Test]

A nail-driving test in the following manner is carried out on the non-aqueous electrolyte secondary batteries according to Examples and Comparative Examples.

(1) In an environment at 25° C., the battery is charged at a constant current of 600 mA to a battery voltage of 4.2 V, and then continuously charged at the constant voltage to a current value of 90 mA.

(2) In an environment at 25° C., the point of a wire nail having a thickness of 2.7 mm is brought into contact with the middle of the lateral surface of the battery charged in (1), and the wire nail is driven at a rate of 1 mm/sec in the direction of the lamination of the electrode assembly. Just after voltage depression of the battery due to internal short is detected, the driving of the wire nail is stopped.

(3) The temperature of the battery surface is determined one minute after the battery starts short due to the wire nail.

The formulation of the first intermediate layer and the second intermediate layer used in Examples and Comparative Examples and the results of the nail-driving test are shown in Table 1.

TABLE 1

|  | First Intermediate Layer | | Second Intermediate Layer | | Electrically Conductive Inorganic Compound | Battery Temperature After Nail-Driving Test (1 min. after) (° C.) |
|---|---|---|---|---|---|---|
|  | Mass Ratio Electrically Conductive Inorganic Compound:Positive Electrode Active Material:PVDF | Thickness (μm) | Mass Ratio Electrically Conductive Inorganic Compound:Al$_2$O$_3$:PVDF | Thickness (μm) | | |
| Example 1 | 5:94:1 | 30 | 5:94:1 | 5 | TiC | 50 |
| Example 2 | 5:94:1 | 30 | 5:94:1 | 5 | WC | 57 |
| Example 3 | 5:94:1 | 30 | 5:94:1 | 5 | TiN | 55 |
| Example 4 |  |  | 5:94:1 | 5 | TiC | 60 |
| Example 5 |  |  | 5:94:1 | 5 | WC | 65 |
| Example 6 |  |  | 5:94:1 | 5 | TiN | 62 |
| Example 7 | 5:94:1 | 30 |  |  | TiC | 65 |
| Example 8 | 5:94:1 | 30 |  |  | WC | 70 |
| Example 9 | 5:94:1 | 30 |  |  | TiN | 68 |
| Comparative Example 1 | — | — | — | — | — | 120 |

The non-aqueous electrolyte secondary batteries according to Examples exhibit a much lower battery temperature after the nail-driving test than those according to Comparative Examples. Specifically, it can be said that the rise of the battery temperature after internal short can be prevented by using a positive electrode for a secondary battery, including: a positive electrode current collector, a positive electrode mixture layer, and an intermediate layer disposed between the positive electrode current collector and the positive electrode mixture layer, wherein (1) the intermediate layer includes: a first intermediate layer including an electrically conductive inorganic compound and a positive electrode active material, and a second intermediate layer including an insulating inorganic material and an electrically conductive inorganic compound, and the electrically conductive inorganic compound reacts to become an insulating oxide at 300° C. or more; (2) the intermediate layer includes an electrically conductive inorganic compound and a positive electrode active material, and the electrically conductive inorganic compound reacts to become an insulating oxide at 300° C. or more; or (3) the intermediate layer includes an electrically conductive inorganic compound and an insulating inorganic material that is a nonoxide, and the electrically conductive inorganic compound reacts to become an insulating oxide at 300° C. or more. Among the batteries according to Examples 1 to 9, those according to Examples 1 to 3, which each include an intermediate layer that includes the first intermediate layer including an electrically conductive inorganic compound and a positive electrode active material, and a second intermediate layer including an insulating inorganic material and an electrically conductive inorganic compound, can sufficiently prevent the rise of the battery temperature after internal short.

REFERENCE SIGNS LIST 10 secondary battery
11 positive electrode
12 negative electrode
13 separator
14 electrode assembly
15 case body
16 sealing assembly
17, 18 insulating plate
19 positive electrode lead
20 negative electrode lead
21 projecting portion
22 filter
22a opening of filter
23 lower vent member
24 insulating member
25 upper vent member
26 cap
26a opening of cap
27 gasket
30 positive electrode current collector
31 intermediate layer
31a first intermediate layer
31b second intermediate layer
32 positive electrode mixture layer

The invention claimed is:

1. A positive electrode for a secondary battery, comprising:
a positive electrode current collector;
a positive electrode mixture layer; and
an intermediate layer disposed between the positive electrode current collector and the positive electrode mixture layer, wherein
the intermediate layer consists essentially of a mixture of an inorganic compound, a positive electrode active material, and a binder,
the inorganic compound remains an electrically conductive nonoxide at a temperature less than 300° C. and becomes an insulating oxide at 300° C. or more,
the positive electrode mixture layer includes a positive electrode active material, a binder, and a conductive agent that is different from the electrically conductive nonoxide,
wherein a content of the inorganic compound in the intermediate layer is within a range of 0.1 mass % to 20 mass %, and wherein the intermediate layer further includes an insulating inorganic material that includes at least one of the group consisting of aluminum oxide, titanium oxide, zirconium oxide, silicon oxide, manganese oxide, magnesium oxide, nickel oxide, boron nitride, aluminum nitride, magnesium nitride, silicon nitride, aluminum fluoride, lithium fluoride, sodium fluoride, magnesium fluoride, calcium fluoride, barium fluoride, aluminum hydroxide, boehmite, and Ni—Cu—Zn ferrite.

2. The positive electrode for a secondary battery according to claim 1, wherein the inorganic compound becomes the insulating oxide at a temperature of 300° C. or more and 500° C. or less.

3. The positive electrode for a secondary battery according to claim 1, wherein the inorganic compound includes at least one of the group consisting of TiC, ZrC, HfC, VC, NbC, TaC, WC, TiN, ZrN, HfN, VN, NbN, TaN, $TiB_2$, $ZrB_2$, $HfB_2$, $VB_2$, $NbB_2$, $TaB_2$, $W_2B_5$, $Mo_2B_5$, FeB, NiB, $TiSi_2$, $ZrSi_2$, $CrSi_2$, $VSi_2$, $NbSi_2$, $TaSi_2$, $WSi_2$, and $MoSi_2$.

4. The positive electrode for a secondary battery according to claim 1, wherein a thickness of the intermediate layer is one half or less of a thickness of the positive electrode mixture layer.

5. A secondary battery including:
the positive electrode according to claim 1;
a negative electrode; and
an electrolyte.

6. The positive electrode for a secondary battery according to claim 1, wherein a content of the positive electrode active material in the intermediate layer is within a range of 80 mass % to 99.9 mass %.

7. The positive electrode for a secondary battery according to claim 1, wherein the positive electrode active material included in the intermediate layer is the same material as the positive electrode active material included in the positive electrode mixture layer.

8. The positive electrode for a secondary battery according to claim 1, wherein the positive electrode active material included in the intermediate layer is a different material from the positive electrode active material included in the positive electrode mixture layer.

9. The positive electrode for a secondary battery according to claim 1, wherein a thickness of the intermediate layer is 1/150 or more and one half or less of a thickness of the positive electrode mixture layer.

10. The positive electrode for a secondary battery according to claim 1, wherein a content of the binder in the intermediate layer is 0.1 mass % to 5 mass %.

* * * * *